Figure 1:
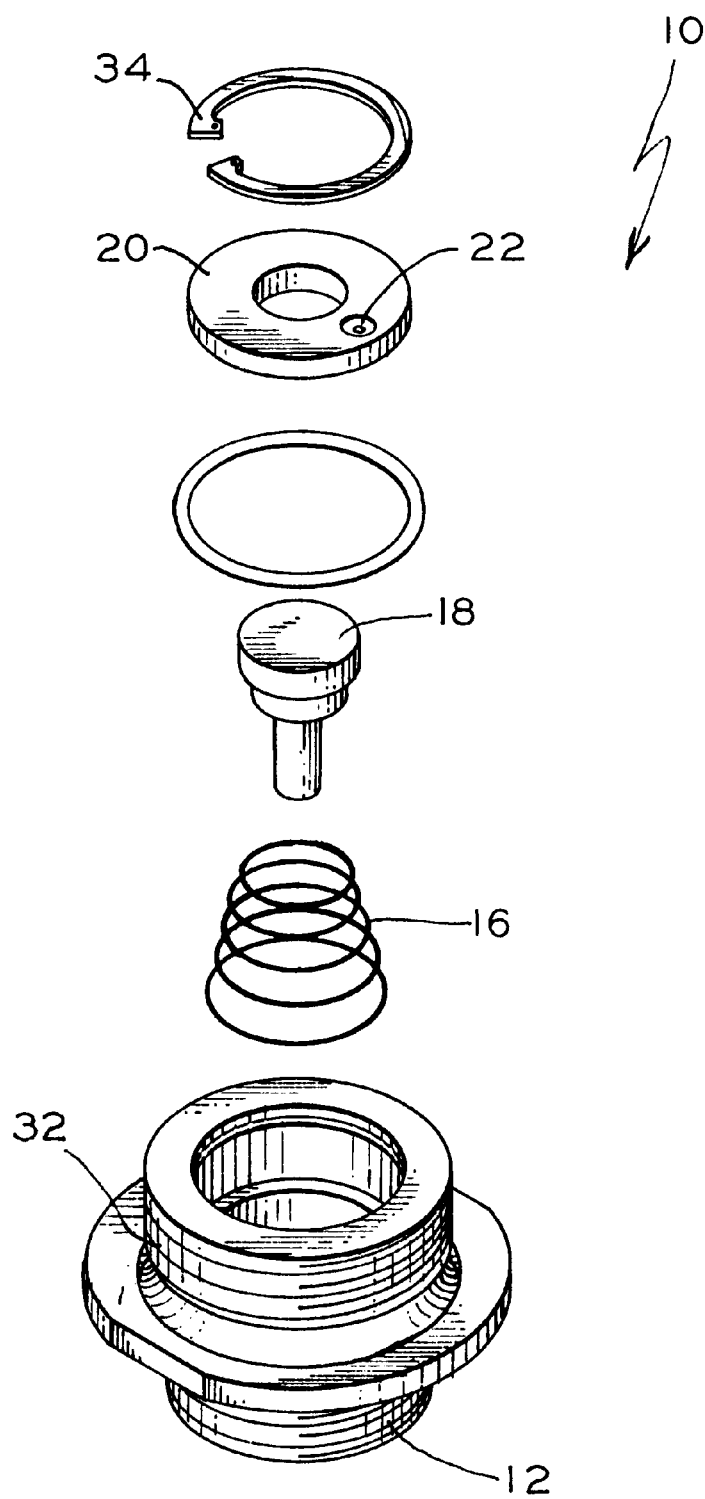

United States Patent [19]
Jones et al.

[11] Patent Number: 6,014,820
[45] Date of Patent: Jan. 18, 2000

[54] SHUTTLE VALVE FOR TWIN TOWER AIR DRYER

[75] Inventors: Charlie E. Jones, Greenville; Michael V. Kazakis, Simpsonville; Murtaza R. Dossaji, Spartanburg, all of S.C.

[73] Assignee: Westinghouse Air Brake Company, Wilmerding, Pa.

[21] Appl. No.: 09/017,126

[22] Filed: Feb. 2, 1998

[51] Int. Cl.[7] .................................................. F26B 19/00
[52] U.S. Cl. .............................. 34/548; 34/565; 34/80; 137/513.7
[58] Field of Search .............................. 34/548, 557, 565, 34/80, 81, 82; 55/302, 337, 424, 426; 96/134, 137, 209; 137/513.7, 625.27, 625.66

[56] References Cited

U.S. PATENT DOCUMENTS

| | | | |
|---|---|---|---|
| 3,592,563 | 7/1971 | Glass et al. ........................ | 137/596.2 X |
| 3,877,904 | 4/1975 | Lowrie .................................. | 55/426 X |
| 4,149,861 | 4/1979 | Sogo et al. ............................ | 55/426 X |
| 4,247,311 | 1/1981 | Seibert et al. ........................ | 96/111 |
| 4,525,183 | 6/1985 | Cordes et al. ....................... | 137/543.15 |
| 4,853,010 | 8/1989 | Spence et al. ....................... | 55/426 X |
| 5,604,991 | 2/1997 | Castle et al. ........................ | 34/80 |
| 5,662,727 | 9/1997 | Castle et al. ........................ | 34/80 X |
| 5,685,896 | 11/1997 | Castle et al. ........................ | 34/80 X |

*Primary Examiner*—Henry Bennett
*Assistant Examiner*—Steve Gravini
*Attorney, Agent, or Firm*—James Ray & Associates

[57] ABSTRACT

A shuttle valve for a gas drying system that cleans and dries a stream of unpurified pressurized gas received from a source thereof and supplied to a pneumatic system that uses such a purified pressurized air. The valve includes a housing that connects a drying assembly to a structure that conveys the unpurified pressurized air to the drying assembly. The housing contains a choke disc provided with an orifice and a movable piston located in axial alignment with the choke disc. When the unpurified pressurized air is directed into the drying assembly for drying, the piston moves away from the choke disc to permit dry air to freely flow from the drying assembly and through the valve to the system utilizing purified pressurized air.

9 Claims, 4 Drawing Sheets

SHUTTLE VALVE FOR TWIN TOWER AIR DRYER

CROSS-REFERENCE TO RELATED APPLICATIONS

The invention taught in this patent application is closely related to the inventions taught in U.S. Pat. Nos. 5,423,129, 5,604,991, 5,662,728 and 5,685,896 and is further closely related to the following pending patent applications: "E-1 Twin Tower Air Dryer for an Air Compressor", U.S. Ser. No. 08/979,649 filed Nov. 26, 1997; "E1 Air Dryer Liquid Separator With Baffle", Ser. No. 08/978,796 filed Nov. 26, 1997; "Control Valve With Axial Sealing", Ser. No. 08/978, 551 filed Nov. 26, 1997; "Shuttle Valve Mechanism For Twin Tower Air Dryer", Ser. No. 08/979,198 filed Nov. 26, 1997; "Purge Tube With Flapper Valve For Desiccant Containing Air Dryer", Ser. No. 08/979,197 filed Nov. 26, 1997 and Twin Tower Air Dryer, Ser. No. 09/017 245 being filed concurrently herewith. All of the above-referenced patents and patent applications are assigned to the assignee of this invention. Additionally, the teachings of each of those issued and pending patent applications is incorporated herein by reference thereto.

FIELD OF THE INVENTION

The present invention, generally, relates to twin tower air cleaning and drying systems for air compressors. More particularly, the present invention pertains to a new and improved shuttle valve for twin tower air cleaning and drying systems for such air compressors.

BACKGROUND OF THE INVENTION

It will be appreciated that Westinghouse Air Brake Company air dryers are designed to remove moisture from compressed air for use in compressed air systems as utilized on railway trains, transit vehicles and the like, as necessary to operate the air brake system and air valves. U.S. Pat. No. 5,423,129, assigned to the assignee of this invention and cited above, discloses such a system wherein the compressed air is cleaned and dried by passing it through a regenerating system containing a desiccant material to absorb the moisture and filter-out particulate matter. The desiccant is regenerated by passing a small percentage of the dried air back therethrough which absorbs at least some of the moisture collected in the desiccant and is therefore discarded.

In operation, the above noted prior art air drying system (now referred to as the "single tower" system) receives compressed air from a conventional air compressor, a supply which typically contains an unacceptably high amount of moisture and other particulates suspended therein. This unpurified compressed air is caused to flow upwardly through a desiccant material usually in the form of a porous cartridge containing a porous desiccant media. The desiccant plays the key role within the single tower air drying system in that it absorbs the moisture and traps various particulates (e.g., dust, dirt, etc.) as the compressed air moves upwardly through the desiccant media. Once moisture and particulates are extracted from the air stream, the cleaned and dried compressed air continues flowing from the desiccant media through a purge check valve situated near the top of the tower. This purified compressed air then passes through a side chamber, a part of which eventually reaches a purge volume.

When the air compressor is cycled off, the system operates in a purge mode. During the purge mode, the purified pressurized air contained within the purge volume passes slowly in the reverse direction through a choke in a purge check valve and then back through the desiccant media. This slow stream of dried air reabsorbs a portion of the moisture previously collected within the desiccant media. Having evaporated into this passing stream of dry air, the evaporated moisture eventually exhausts through the sump volume to atmosphere. This gradual purging of dry air back through the system serves to dry out and thus rejuvenate or regenerate the desiccant media. When the air compressor is again cycled on, the tower system returns to operation in a drying mode with the desiccant media then again removing moisture from the stream of unpurified compressed air passing therethrough.

More recently, a twin tower system has been proposed and developed in which a pair of desiccant containing chambers or towers are provided, each alternating back and forth between operation in drying mode and in recycle mode. Accordingly, at any given moment of operation, one tower is operating in air drying cycle while the other is operating in recycle mode or purge cycle. A pair of control valves are provided to automatically switch the flow to reverse these flow directions so that after a defined time period the cycles are reversed so that in effect a continuous operation is achieved with each tower alternately operating in drying mode permitting moisture to collect within the desiccant media while the other tower is in recycle mode removing the collected moisture from the desiccant material or media. This unique system obviously has a greater moisture removing capability and also avoids the need to have the source of unpurified air cycled-off in order to purge the desiccant material of the moisture it has accumulated and thereby eliminate the need to temporarily deprive the pneumatic system of a steady supply of clean and dried compressed air while the compressor is turned off.

In addition to the above advantages, the switching of the two drying assemblies alternately between the drying and the purging modes allows the twin tower system to exsiccate the air stream more efficiently than the prior art single tower system. Two desiccant towers rather than one are employed in the air drying system with one absorbing moisture while the other is being purged of it. The switching of the two drying assemblies alternately between the drying and the purging modes thus serves to continuously purge moisture from the twin tower system. More fully desiccated air is thus supplied to the pneumatic system. The amount, density and overall surface area of the desiccant can also be selected to suit varying needs.

The twin tower system can be applied to a wide variety of pneumatic systems. Typical of the types of pneumatic systems to which the twin tower system could be applied include the pneumatic brake systems of passenger and freight railroad trains, subway trains and various other types of rail related transportation systems. Further examples include the pneumatic brake systems of various truck transport vehicles. Other types of pneumatic systems to which the twin tower system could be applied may be found outside the transportation field.

Another disadvantage of the single tower air drying system is that it is only capable of removing a certain, limited amount of moisture during the purge mode. Because the volume of unpurified air flowing into the system to be dried vastly exceeds the volume of purified air used to purge the desiccant media, the desiccant media never adequately exsiccates during operation of the single tower system. Indeed, the desiccant media adequately exsiccates only after the system has been turned off for a prolonged time sufficient to accomplish same.

SUMMARY AND OBJECTS OF THE INVENTION

There are two primary objectives of the invention. The first of the objectives is to provide air delivery from a compressor to a main reservoir, while also providing a method of purging and regenerating desiccant material for twin towers of an air dryer. The second objective is to provide a novel method of attaching a desiccant canister to a twin tower manifold body wherein such second objective is effected by a shuttle valve threadably connectable to and between a canister and a manifold block which pneumatically connects the two together and connects two such canisters together as well as connecting the canisters to an air compressor and to a system using air dried by the canisters, which system can include the above main reservoir for storing compressed air.

A third objective of the invention is to provide circular, cylindrical shuttle valves that make the manufacture thereof simple and inexpensive, i.e., the components, being circular, can be fabricated in a lathe, for example.

Air from the compressor is alternately directed to the two cartridges via ports in the manifold block, which air travels through desiccant material in the cartridges to respective shuttle valves connecting the cartridges to the manifold block. The pressure of this air forces a piston in the shuttle valve downwardly, which opens a large area around a choke disc in the shuttle valve, thereby allowing air to pass through the disc and around the piston to a fitting of the valve mounted in the manifold block. The air is dried by the desiccant and travels from the valve and through the manifold block to the reservoir.

The process of alternately directing compressed air to the two canisters involves drying air in one canister while the other canister is purged. In the purging process a portion of the dry air exiting from the "drying" canister is directed to the shuttle valve of the "purging" canister. The force of this air, in combination with a valve spring, moves the piston of the valve of the purging canister upwardly against the choke disc thereby closing the valve. A small percentage of the dry air, however, travels through a small orifice provided in the disc to remove moisture from the desiccant in the purging canister, which air is vented to atmosphere.

Further, it is possible to use a variety of orifice sizes for compressors having different output capacities. Such a variance allows for a proper amount of purging air to be supplied to the desiccant depending upon compressor capacity.

THE DRAWINGS

Figure 2:
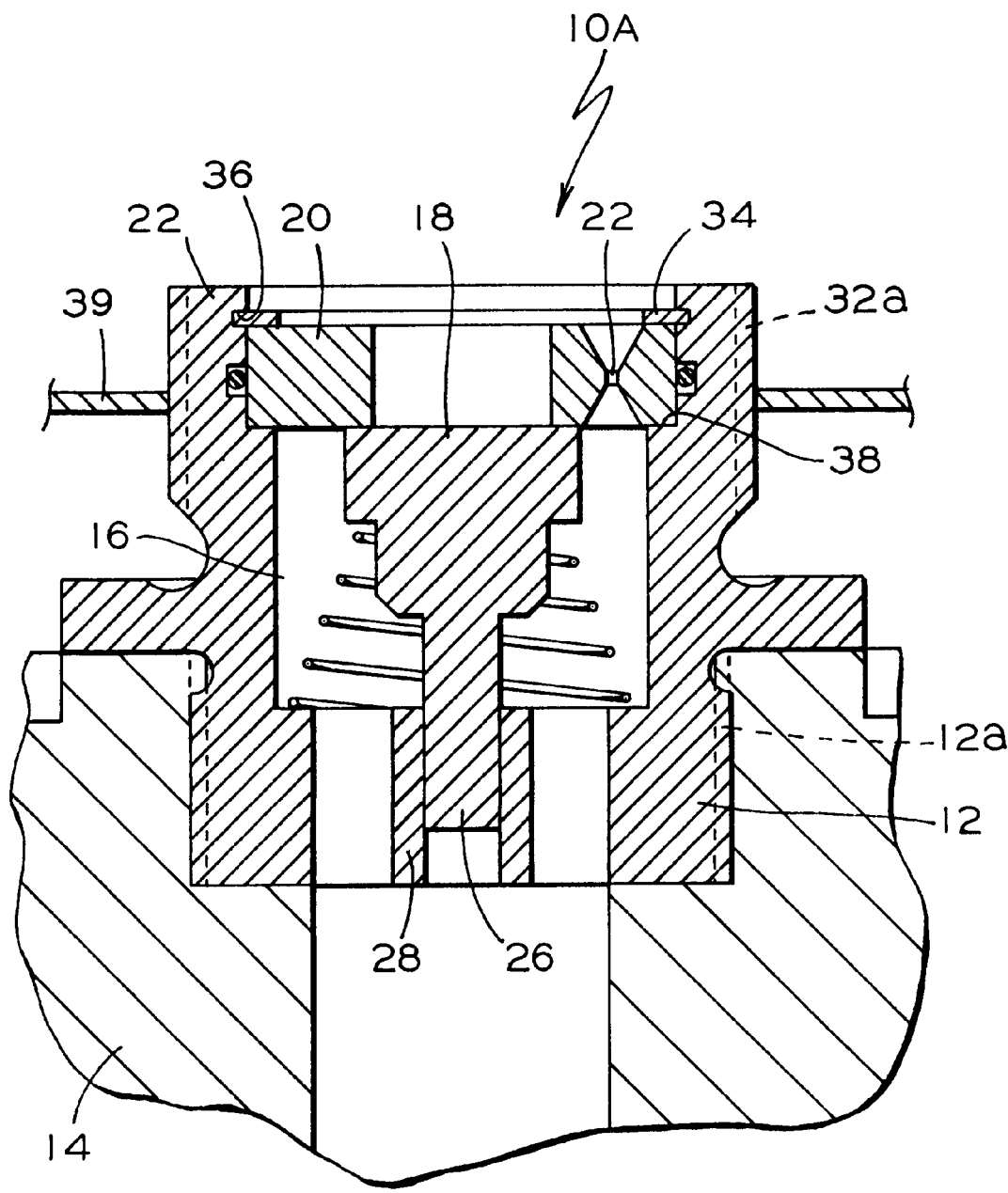
Figure 3:
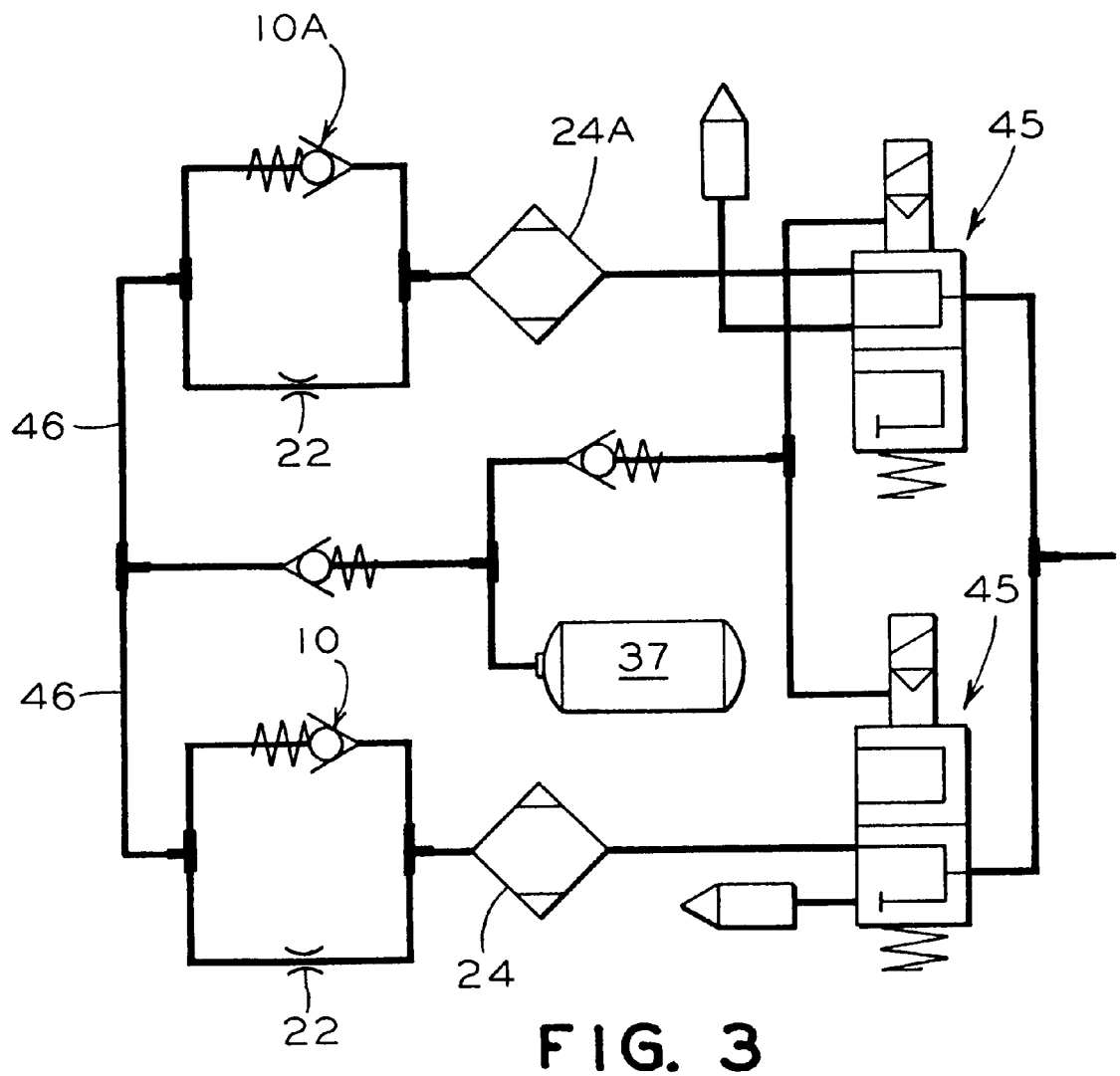
Figure 4:
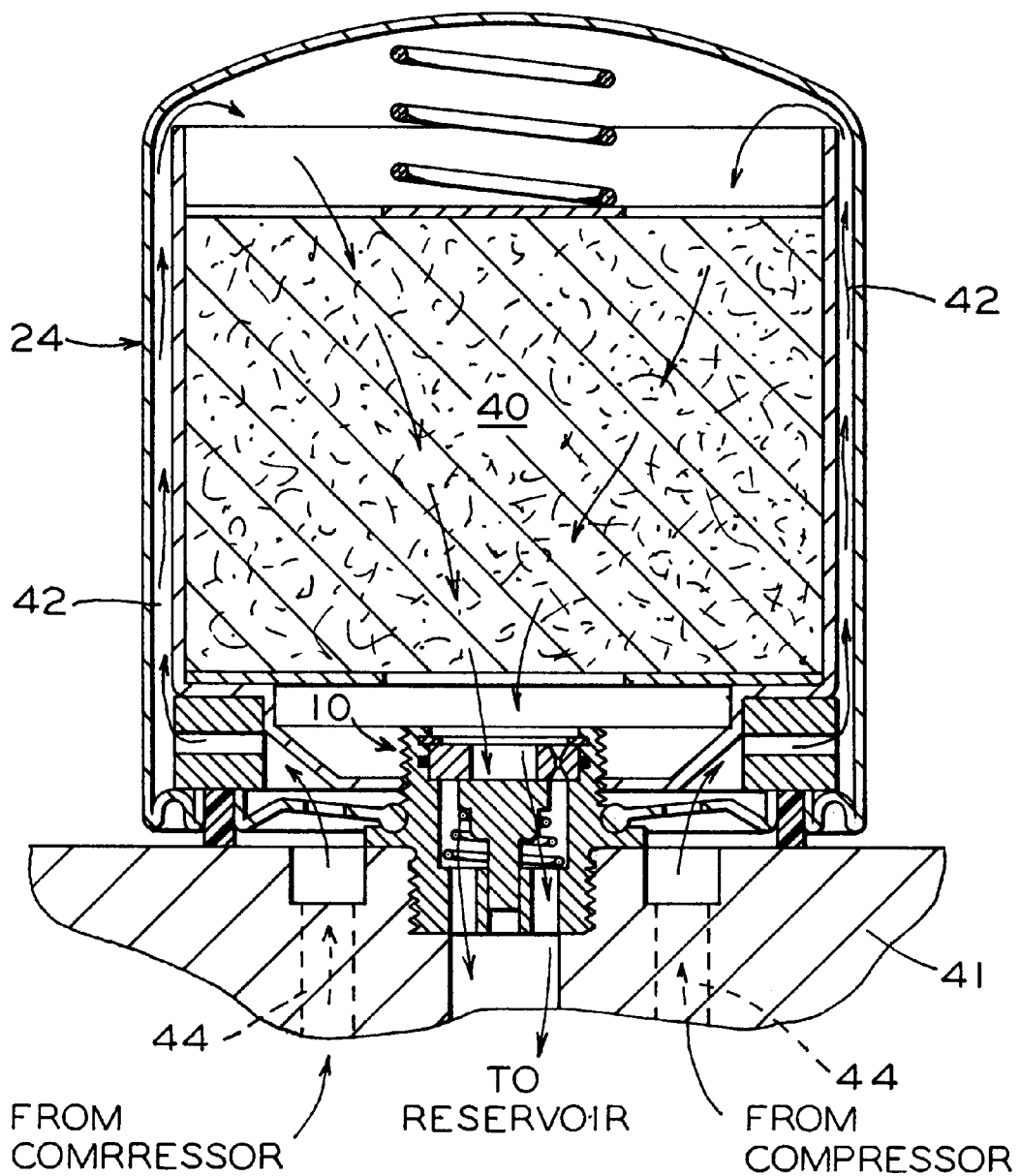

The invention, along with its advantages and objectives, will be better understood from consideration of the following detailed description and the accompanying drawings, in which:

FIG. 1 is an exploded view of the shuttle valve of the invention,

FIG. 2 is a sectional view of the valve of FIG. 1 shown in a closed position and used as a second, twin shuttle valve in a twin tower system, as seen in the schematic pneumatic circuit of FIG. 3, FIG. 3 is a schematic diagram of the shuttle valves of the invention and their pneumatic connections to two desiccant canisters and two control valves, and FIG. 4 is a sectional view of a canister and shuttle valve showing the flow of air through the canister and valve for direction to a storage reservoir as well as threaded connections between the canister, valve and a manifold block.

PREFERRED EMBODIMENT OF THE INVENTION

Referring now to FIG. 1 of the drawings, an exploded view of the shuttle valve of the invention is shown and identified generally by numeral 10. The valve 10 includes a lower threaded fitting 12 for pneumatically connecting the valve to a manifold block 14 (FIG. 2), a coil spring 16 is located between the fitting 12 and a piston 18 and a choke disc 20 is located directly above piston 18, in FIGS. 1, 2 and 4. Disc 20 is provided with a small orifice 22 for directing a small amount of air into a dryer canister 24, such as, depicted in FIG. 4 of the drawings.

Spring 16 seats in fitting 12, as best seen in FIG. 2 of the drawings, and receives a stem 26 of piston 18 that extends into a sleeve 28 provided in fitting 12 for sliding movement therein.

In addition, an O-ring is provided for sealing choke disc 20 in an upper housing portion 32 of valve 10 and a snap ring 34 is shown located above the choke disc in FIGS. 1 and 2 for securing the choke disc in housing portion 32, i.e., the choke disc is held between ring 34, that snaps into a circumferential slot 36 provided in an interior surface of the wall and throat of housing 32, and an integral shoulder 38 provided in the throat of housing 32, all of which are best seen in the sectional view of FIG. 2.

Fitting 12 and housing 32, which form a single integral valve housing, are externally threaded, as indicated by dash lines 12a and 32a in FIG. 2. This allows the valve housing to be threaded respectively into manifold block 14 (FIG. 2) and into a lower wall portion 39 of canister 24. In this manner, canisters are easily connected to and removed from the manifold block and the shuttle valve easily connected to and removed from both.

Valve 10, and twin valve 10A in FIGS. 2 and 3, function in the following manner. Normal operation of an air compressor (not shown) supplies air to a main reservoir at 37 (in FIG. 3) after being directed through desiccant material 40, shown only diagrammatically, in canister 24 (FIG. 4). Compressed air enters into an outside peripheral space 42 within the canister from ports 44 provided in manifold 41 (FIG. 4) and travels to the upper portion of the canister, in FIG. 4, for travel downwardly through the desiccant material to shuttle valve 10. The canister removes moisture and particles from the compressed air before entering the valve and before leaving the valve for travel to reservoir 37, as dry, compressed air, via a common port 46 (i.e. common to two shuttle valves) provided in manifold 41 (FIG. 4).

A portion of the dry air is directed from the "drying" canister to a "purging" canister for rejuvenating the desiccant in the purge canister. This is effected by tower control valves 45 (FIG. 3) that alternately and periodically direct the flow of air from the compressor to two side-by-side canisters, as disclosed in the above pending application Ser. No. 08/979,649. The portion of dry air exiting from "drying" canister 24 in FIG. 4, for example, and slated for the "purge" canister (24A in FIG. 3) by a control valve 45 is sent to second shuttle valve 10A disposed in the lower wall 39 of second canister 24A (schematically shown in FIG. 3). The flow of this air to valve 10A is conducted by a port not shown provided in manifold block 14 (FIG. 2), which extends between valve 10A and a control valve 45 that effects the switching between the two canisters and their shuttle valves 10 and 10A.

The dry air from the drying canister enters valve 10A beneath piston 18 and forces the piston upwardly, in FIG. 2, to seat against choke disc 20. This closes the path for air flow about the piston and through the center of the choke disc. A limited dry air flow, however, is permitted through disc orifice 22 and upwardly into the desiccant in the purge canister 24A. This limited dry air flow contacts moisture in the desiccant as it moves therethrough and moist air is formed that is directed from the canister via the port (not shown) provided in manifold block 14 (FIG. 2) that connects to peripheral space 42 within the canister. The moist air is vented to atmosphere via such port.

Orifice 22 limits the flow of air from the drying canister 24 to a small percentage of the flow volume from the drying canister so that the majority of the air flow is to the reservoir for use in systems that utilize compressed air.

The above process is reversed on the occurence of the next change or switch between the two canisters 24 and 24A whereby the two canisters reverse their functions, i.e., the drying canister becomes the purging canister and purging canister becomes the drying canister, as described in the earlier cited application Ser. No. 08/976,649.

The shuttle valve components of the present invention operate effectively in their assigned tasks, and such components, being circular and cylindrical structures, are easily machined and manufactured.

While a presently preferred embodiment for carrying out the instant invention has been set forth in detail, those persons skilled in the air drying art to which this invention pertains will recognize various alternative ways of practicing the invention without departing from the spirit and scope of the claims appended hereto.

We claim:

1. A shuttle valve for a twin tower gas drying system having two drying assemblies for cleaning and drying a stream of unpurified pressurized air received from a source thereof and for supplying purified air to a pneumatic system with a purge percentage of such purified air for purging alternately from each such drying assembly moisture previously retained via remoisturization of such purified air, said shuttle valve comprising:

a housing connecting one of such drying assemblies to such source of such unpurified pressurized air, a choke disc located within said housing and having an orifice, a movable piston located in axial alignment with said choke disc, such that when such unpurified pressurized air is directed into such one of such drying assemblies for drying such unpurified pressurized air, the piston moves away from said choke disc to permit relatively dry air to freely flow from such one drying assembly and through said shuttle valve to such pneumatic system with a portion of such dry air being directed to a second shuttle valve and second drying assembly for removing moisture from such second drying assembly.

2. The shuttle valve of claim 1 further including:

a seal located between the choke disc and said housing for sealing said choke disc to said housing.

3. The shuttle valve of claim 2 wherein the seal is an O-ring.

4. The shuttle valve of claim 1 further including:

a spring located about the piston for assisting in closing of the piston against the choke disc when air is admitted behind or beneath the piston and directed to the choke disc.

5. The shuttle valve of claim 4 wherein the spring is a coil spring.

6. The shuttle valve of claim 1 further including a ring seatable in an inside surface of said housing for retaining the choke disc in the housing.

7. The shuttle valve of claim 6 wherein the ring is a snap ring that snaps into a periphical slot provided in the inside surface of said housing.

8. The shuttle valve of claim 1 wherein the housing is provided with external threads for threading into such one drying assembly and into a manifold block that supplies such unpurified pressurized air to such one drying assembly.

9. The shuttle valve of claim 1 wherein the orifice is variable.

* * * * *